(12) United States Patent
Trombetta et al.

(10) Patent No.: US 11,712,630 B2
(45) Date of Patent: Aug. 1, 2023

(54) DYNAMIC INTERFACES FOR LAUNCHING DIRECT GAMEPLAY

(71) Applicants: SONY INTERACTIVE ENTERTAINMENT LLC, San Mateo, CA (US); SONY INTERACTIVE ENTERTAINMENT INC., Tokyo (JP)

(72) Inventors: Steven Trombetta, San Mateo, CA (US); Charles Wayne Denison, II, San Mateo, CA (US); Benedikt Neuenfeldt, Tokyo (JP); Akihiko Kusumoto, Tokyo (JP); Nobukazu Koyama, Tokyo (JP); Atsushi Fuse, Tokyo (JP)

(73) Assignees: SONY INTERACTIVE ENTERTAINMENT LLC; SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 17/241,829

(22) Filed: Apr. 27, 2021

(65) Prior Publication Data
US 2021/0245059 A1 Aug. 12, 2021

Related U.S. Application Data

(63) Continuation of application No. 16/135,273, filed on Sep. 19, 2018, now Pat. No. 10,987,593.

(51) Int. Cl.
*A63F 13/69* (2014.01)
*H04L 67/306* (2022.01)
(Continued)

(52) U.S. Cl.
CPC .......... *A63F 13/795* (2014.09); *A63F 13/493* (2014.09); *A63F 13/497* (2014.09);
(Continued)

(58) Field of Classification Search
CPC .... A63F 13/795; A63F 13/69; G07F 17/3239; G07F 17/3272; H04L 67/22; H04L 67/306
See application file for complete search history.

(56) References Cited

U.S. PATENT DOCUMENTS 7,073,187 B1 7/2006 Hendricks et al.
7,614,955 B2 11/2009 Farnham et al.
(Continued)

FOREIGN PATENT DOCUMENTS

CN 113260433 A 8/2021
CN 113260435 A 8/2021
(Continued)

OTHER PUBLICATIONS

PCT Application No. PCT/US2019/051140 International Preliminary Report on Patentability dated Mar. 23, 2021.
(Continued)

*Primary Examiner* — Werner G Garner
(74) *Attorney, Agent, or Firm* — Polsinelli LLP

(57) ABSTRACT

A method for launching interactive content including associating one or more templates with a corresponding one or more activities of an interactive content title and transmitting the one or more templates to a platform server. The method includes selecting and displaying a set of templates generated from the one or more templates received on a user device. The method includes launching the activity in the interactive title based on a template selected by a user.

25 Claims, 4 Drawing Sheets

(51) Int. Cl.
*A63F 13/493* (2014.01)
*H04L 67/50* (2022.01)
*A63F 13/795* (2014.01)
*G07F 17/32* (2006.01)
*A63F 13/497* (2014.01)

(52) U.S. Cl.
CPC .......... *A63F 13/69* (2014.09); *G07F 17/3239* (2013.01); *G07F 17/3272* (2013.01); *H04L 67/306* (2013.01); *H04L 67/535* (2022.05)

(56) References Cited

U.S. PATENT DOCUMENTS

| | | |
|---|---|---|
| 7,846,024 B2 | 12/2010 | Graepel et al. |
| 8,328,610 B2 | 12/2012 | Shimura et al. |
| 8,425,330 B1 | 4/2013 | Kislyi et al. |
| 8,727,892 B1 | 5/2014 | Chun |
| 9,120,020 B2 | 9/2015 | Michel et al. |
| 9,526,993 B2 | 12/2016 | Rom et al. |
| 9,610,504 B2 | 4/2017 | Kislyi et al. |
| 9,656,176 B2 | 5/2017 | Riego |
| 9,764,240 B2 | 9/2017 | Khan |
| 9,931,571 B2 | 4/2018 | Cho |
| 10,130,872 B2 | 11/2018 | Buhr et al. |
| 10,130,889 B2 | 11/2018 | Riego |
| 10,343,069 B2 | 7/2019 | Noss |
| 10,449,458 B2 | 10/2019 | Torres |
| 10,695,671 B2 | 6/2020 | Trombetta et al. |
| 10,765,952 B2 | 9/2020 | Trombetta |
| 10,987,593 B2 | 4/2021 | Trombetta |
| 11,249,623 B2 | 2/2022 | Trombetta |
| 11,364,437 B2 | 6/2022 | Trombetta |
| 2002/0137565 A1 | 9/2002 | Blanco |
| 2006/0121991 A1 | 6/2006 | Borinik et al. |
| 2006/0287099 A1 | 12/2006 | Shaw et al. |
| 2007/0082659 A1 | 4/2007 | Nevalainen |
| 2007/0087799 A1 | 4/2007 | Van Luchene |
| 2007/0117635 A1 | 5/2007 | Spanton et al. |
| 2007/0173325 A1 | 7/2007 | Shaw et al. |
| 2007/0207860 A1 | 9/2007 | Yamauchi et al. |
| 2007/0218997 A1 | 9/2007 | Cho |
| 2008/0242420 A1 | 10/2008 | Graepel et al. |
| 2009/0042646 A1 | 2/2009 | Sarkar et al. |
| 2009/0104956 A1 | 4/2009 | Kay et al. |
| 2009/0111576 A1 | 4/2009 | Ostergren et al. |
| 2009/0325711 A1 | 12/2009 | Bronstein et al. |
| 2009/0325712 A1 | 12/2009 | Rance |
| 2010/0222147 A1 | 9/2010 | Langan et al. |
| 2011/0177863 A1 | 7/2011 | Davidsion et al. |
| 2011/0250970 A1 | 10/2011 | Van Os et al. |
| 2012/0142429 A1 | 6/2012 | Muller |
| 2012/0157211 A1 | 6/2012 | Kane et al. |
| 2012/0166994 A1 | 6/2012 | Aonuma et al. |
| 2012/0210355 A1 | 8/2012 | Kim et al. |
| 2012/0311041 A1 | 12/2012 | Aonuma et al. |
| 2012/0322560 A1 | 12/2012 | Joo |
| 2013/0007013 A1 | 1/2013 | Geisner et al. |
| 2013/0260896 A1 | 10/2013 | Miura et al. |
| 2013/0310181 A1 | 11/2013 | Kislyi et al. |
| 2014/0274402 A1 | 9/2014 | Michel et al. |
| 2015/0038233 A1 | 2/2015 | Rom et al. |
| 2015/0127731 A1 | 5/2015 | Hamada et al. |
| 2016/0001181 A1 | 1/2016 | Marr et al. |
| 2016/0001183 A1 | 1/2016 | Harvey et al. |
| 2016/0082355 A1 | 3/2016 | Kobayashi et al. |
| 2016/0158656 A1 | 6/2016 | Condrey et al. |
| 2016/0166935 A1 | 6/2016 | Condrey et al. |
| 2016/0184712 A1 | 6/2016 | Colenbrander |
| 2016/0346701 A1 | 12/2016 | George |
| 2017/0087470 A1 | 3/2017 | Bostick et al. |
| 2017/0182423 A1 | 6/2017 | Leppinen et al. |
| 2017/0291109 A1 | 10/2017 | Jensen |
| 2018/0065048 A1 | 3/2018 | Lebrun et al. |
| 2018/0102029 A1 | 4/2018 | Leslie et al. |
| 2018/0193741 A1 | 7/2018 | Kiwada et al. |
| 2018/0250591 A1 | 9/2018 | Prado Rojas et al. |
| 2018/0256982 A1 | 9/2018 | Kuneida et al. |
| 2018/0290060 A1 | 10/2018 | Noss |
| 2019/0057686 A1* | 2/2019 | Yong .................. G10L 15/1815 |
| 2019/0262717 A1 | 8/2019 | Thielbar |
| 2019/0266845 A1 | 8/2019 | Trombetta et al. |
| 2019/0282907 A1 | 9/2019 | Jensen |
| 2019/0310743 A1* | 10/2019 | Yamashita ............. G06N 20/00 |
| 2020/0086217 A1 | 3/2020 | Trombetta et al. |
| 2020/0094148 A1 | 3/2020 | Trombetta et al. |
| 2020/0097147 A1 | 3/2020 | Trombetta et al. |
| 2020/0101377 A1 | 4/2020 | Trombetta et al. |
| 2020/0213321 A1 | 7/2020 | Herman |
| 2020/0330863 A1 | 10/2020 | Trombetta |

FOREIGN PATENT DOCUMENTS

| | | |
|---|---|---|
| CN | 113272031 A | 8/2021 |
| CN | 113348024 A | 9/2021 |
| JP | 2022-502125 | 1/2022 |
| JP | 2022-502127 | 1/2022 |
| JP | 2022-503919 | 1/2022 |
| JP | 2022-514449 | 2/2022 |
| WO | WO 2013/165427 | 11/2013 |
| WO | WO 2014/194695 | 12/2014 |
| WO | WO 2020/060877 | 3/2020 |
| WO | WO 2020/060879 | 3/2020 |
| WO | WO 2020/060880 | 3/2020 |
| WO | WO 2020/068462 | 4/2020 |

OTHER PUBLICATIONS

PCT Application No. PCT/US2019/051140 International Search Report and Written Opinion dated Nov. 15, 2019.
PCT Application No. PCT/US2019/051146 International Preliminary Report on Patentability dated Mar. 23, 2021.
PCT Application No. PCT/US2019/051146 International Search Report and Written Opinion dated Nov. 18, 2019.
PCT Application No. PCT/US2019/051157 International Preliminary Report on Patentability dated Mar. 23, 2021.
PCT Application No. PCT/US2019/051157 International Search Report and Written Opinion dated Oct. 16, 2019.
PCT Application No. PCT/US2019/051150 International Preliminary Report on Patentability dated Mar. 23, 2021.
PCT Application No. PCT/US2019/051150 International Search Report and Written Opinion dated Nov. 4, 2019.
U.S. Appl. No. 16/135,273 Final Office Action dated Oct. 9, 2020.
U.S. Appl. No. 16/135,273 Office Action dated Jan. 17, 2020.
EP 19863543.5 Extended European Search Report dated Jun. 3, 2022.
EP 19863059.2 Extended European Search Report dated May 13, 2022.
EP 19863777.9 Extended European Search Report dated Jun. 2, 2022.
EP 19867541.5 Extended European Search Report dated May 23, 2022.

* cited by examiner

DYNAMIC INTERFACES FOR LAUNCHING DIRECT GAMEPLAY

CROSS-REFERENCE TO RELATED APPLICATIONS

The present application is a continuation and claims the priority benefit of U.S. patent application Ser. No. 16/135,273 filed Sep. 19, 2018, now U.S. Pat. No. 10,987,593, the disclosure of which is incorporated herein by reference.

BACKGROUND

1. Field of the Invention

The present technology pertains to providing dynamic interactive interfaces. More specifically, the present technology may include launching direct gameplay and providing dynamic interfaces.

2. Description of the Related Art

User interfaces for platform-based gameplay (e.g., Sony PlayStation®) may include a variety of different user interfaces used to select content (e.g., a game) to play, interact with other users, or otherwise interact with the selected content or other content in different ways. Digital games may include different modes of interaction, such as multi-player, single-player, open world, competitive, etc. Each game title (and each gameplay mode thereof) may be associated with different user interfaces.

Presently available ways for users to begin gameplay may include steps, such as signing into a platform, selecting a game title, signing into the game, selecting one or more options on a menu, joining co-players for a multi-player session, selecting a stage, etc. Each step may be associated with different user interfaces.

The user interfaces used in digital games may also display information about the user, peers, and gameplay by the user and/or peers. Presently available user interfaces for displaying the user gameplay data may include displaying a string text and/or a specific achievement (e.g., a trophy) provided by each game.

Due to its usage in numerous aspects of digital content interaction, user interfaces can have significant impact on user experience. Such interfaces may, for example, detract from the user experience when gameplay information and statistics are not displayed or poorly displayed. Further, such interfaces may increase the time and amount of operations or steps a user must take to launch and play a selected portion of a game, and may thereby frustrate or inconvenience a user trying to launch a game.

There is, therefore, a need in the art for systems and methods for launching direct gameplay and providing a dynamic interface.

SUMMARY OF THE PRESENTLY CLAIMED INVENTION

Embodiments of the present invention include systems and methods for directly launching interactive content. One or more templates may be stored in memory. Each template may define a different activity within an interactive content title. Such templates may also link to a starting point of the corresponding defined activity within the interactive content title. A set of the stored templates may be provided to a user device and a selection of a template may be received during a session established with the user device. Such selection may result in identifying the activity defined by the selected template and launching the identified activity within the interactive content title associated with the identified activity at the starting point linked to by the selected template.

Various embodiments may include methods for directly launching interactive content. Such methods may include establishing a session with a user device, wherein a set of stored templates is provided to the user device in the session. Each template may define a different activity within an interactive content title. Each template may link to a starting point of the corresponding defined activity within the interactive content title. Such methods may include receiving a selection from the user device specifying one of the provided set of templates. Such methods may include identifying the activity defined by the selected template, wherein the identified activity may be associated with an identified interactive content title. Such methods may include launching the identified activity within the interactive content title at the starting point linked to by the selected template.

Additional embodiments may include systems for directly launching interactive content. Such systems may include a network interface that establishes a session with a user device over a communication network, and a processor that executes instructions stored in memory. A set of templates may be provided to the user device in the session. Each template may define a different activity within an interactive content title and may link to a starting point of the corresponding defined activity within the interactive content title. Execution of the instructions by the processor may identify the activity defined by the selected template and the identified activity may be associated with an identified interactive content title. Execution of the instructions by the processor may launch the identified activity within the interactive content title at the starting point linked to by the selected template.

Further embodiments include non-transitory computer-readable storage media having embodied thereon a program executable by a processor to perform a method for directly launching interactive content as described above.

DETAILED DESCRIPTION

The detailed description set forth below is intended as a description of various configurations of the subject technology and is not intended to represent the only configurations in which the technology can be practiced. The appended drawings are incorporated herein and constitute a part of the detailed description. The detailed description includes specific details for the purpose of providing a more thorough understanding of the technology. However, it will be clear and apparent that the technology is not limited to the specific details set forth herein and may be practiced without these details. In some instances, structures and components are shown in block diagram form in order to avoid obscuring the concepts of the subject technology.

Embodiments of the present invention include systems and methods for launching direct gameplay and providing dynamic interfaces. A template of an interactive content title may be associated with an activity of the title. The template may be transmitted to and displayed on a user device. The user can select the template, which may then launch the activity associated with the template within the title and generate an object to capture and store data related to the activity. Data from the object can be displayed in real-time to show a current progress of the user participating in the activity. After completion of the activity, the activity can be displayed as a re-playable activity, and data gathered during the activity can be used to dynamically update a user profile, display activity history, or predict future templates and/or activities with which the user is likely to interact.

Figure 1A:
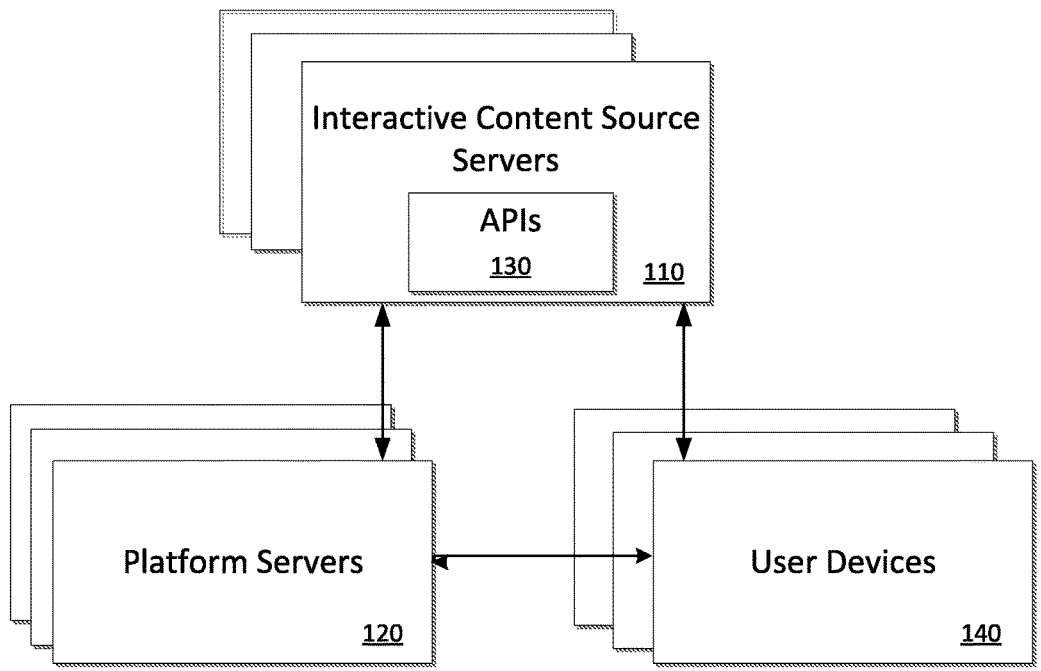
FIG. 1A illustrates a network environment in which a system for launching interactive content and providing dynamic interfaces may be implemented.
Figure 1B:
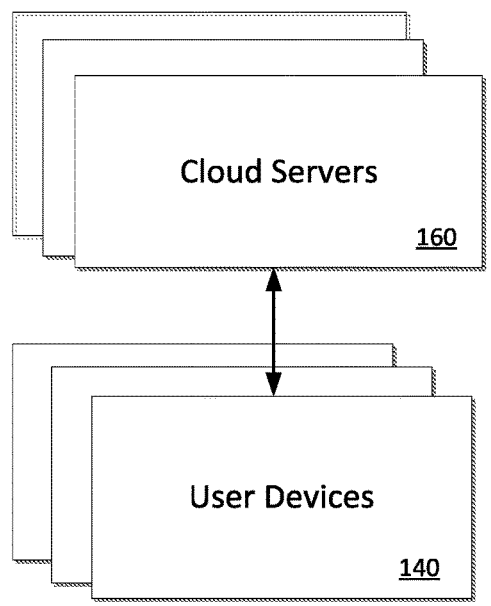
FIG. 1B illustrates a network environment in which a system for launching interactive content and providing dynamic interfaces may be implemented on cloud servers.

FIGS. 1A-B illustrate a network environment 100 in which a system for directly launching interactive content may be implemented and a network 150 in which a system for directly launching interactive content may be implemented on cloud servers 160. The network environment 100 may include one or more interactive content source servers 110 that provide interactive content (e.g., video games, interactive video, etc.), platform servers 120, and user devices 140.

Interactive content source servers 110 may maintain and provide interactive content titles available for play to a user device 140 over a communication network. Such servers 110 may be implemented on cloud servers 160 within a network environment 150, as shown in FIG. 1B. Each interactive content title may include one or more templates corresponding to one or more activities available within the content title. Such a template may provide a structured data set regarding the corresponding activities and that may be used as the basis for tracking and displaying information regarding the corresponding activities in real-time.

In one example, the interactive content title is a video game title, and the one or more templates may correspond to different modes of competitive gameplay available within that game title. In another example, the one or more templates may correspond to different chapters of an interactive storyline. Each template may be associated with a portion of the interactive content title where the corresponding activity starts within the interactive content title. For example, the template may include a waypoint within a portion of a game (e.g., at a specific game environment location at a specific point in time in the game storyline) where an activity starts. In another example, the template may virtually teleport a character of the user to the location within the game environment that is closest to the start of the associated activity. The template may also be associated with matchmaking so as to assign the user to a competitive match (e.g., by skill, experience level, or availability of other peers). Each template may be updated, edited, or removed, or new templates may be created. The one or more templates may be stored at the interactive content source servers 110 or at platform server 120 and retrieved therefrom.

The platform server 120 may be responsible for communicating with the different interactive content source servers 110 in order to provide one or more templates to the user device 140. Such server 120 may be implemented on the cloud servers 160. The interactive content source servers 110 may communicate with multiple platform servers 120. The platform server 120 may carry out instructions, for example, for selecting a set of templates from the one or more templates to display on the user device 140. Such selecting may be based on an identified user intent, which may change as the user interacts with more interactive content titles. As such, the selected set of templates can be different each time the user accesses the user device 140 and similarly, different sets of templates can be selected for different users. The platform server 120 may also carry out instructions, for example, for tracking and displaying up-to-date information or progress of a user profile or user progress within the interactive title (e.g., progress of an activity, competitive match, gameplay, storyline, etc.). The platform server 120 may also generate a user interface to be displayed on a specific user device 140 by which the user can view and select templates, interactive content, user data, history, or the like.

The interactive content titles and their corresponding one or more templates may be provided through an application programming interface (API) 130, which allows various types of interactive content sources server 110 to communicate with different platform servers 120 and different user devices 140. API 130 may be specific to the particular computer programming language, operating system, protocols, etc., of the interactive content source servers 110 providing the interactive content titles, the platform servers 120 providing the associated templates, and user devices 140 receiving the same. In a network environment 100 that includes multiple different types of interactive content source servers 110 (or platform servers 120 or user devices 140), there may likewise be a corresponding number of APIs 130.

The user device 140 may include a plurality of different types of computing devices. For example, the user device 150 may include any number of different gaming consoles, mobile devices, laptops, and desktops. Such user devices 140 may also be configured to access data from other storage media, such as, but not limited to memory cards or disk drives as may be appropriate in the case of downloaded services. Such devices 140 may include standard hardware computing components such as, but not limited to network and media interfaces, non-transitory computer-readable storage (memory), and processors for executing instructions that may be stored in memory. These user devices 140 may also run using a variety of different operating systems (e.g., iOS, Android), applications or computing languages (e.g., C++, JavaScript). An exemplary user device 140 is described in detail herein with respect to FIG. 4.

Figure 2:
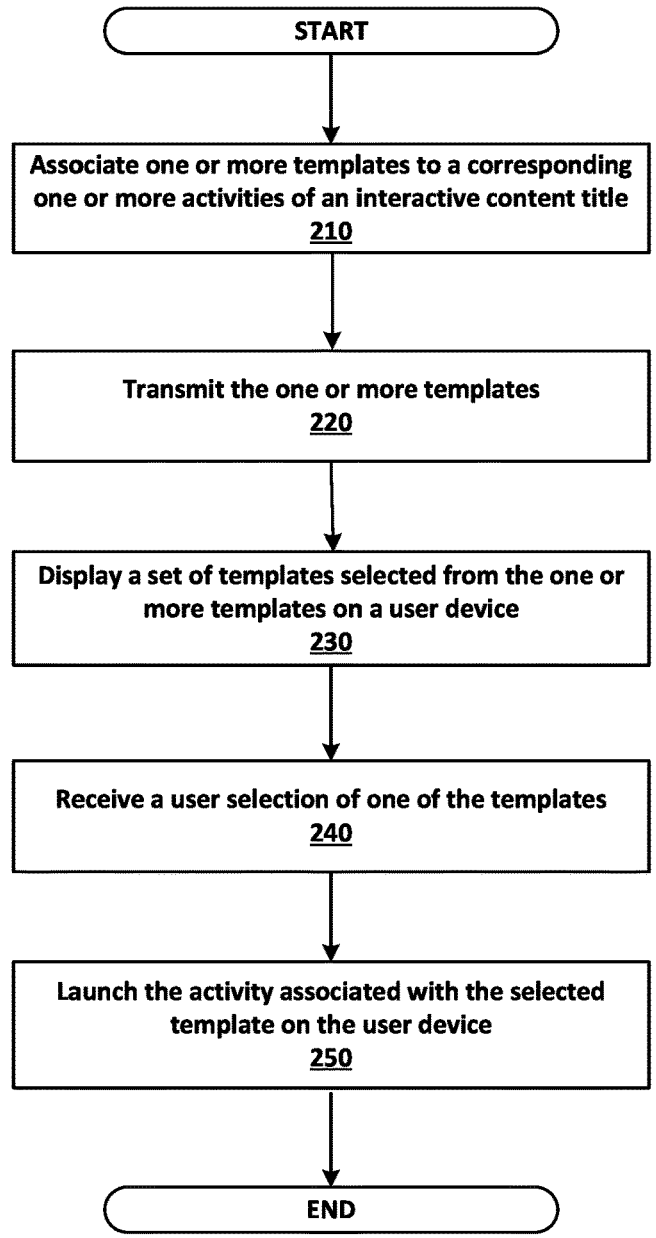
FIG. 2 is a flowchart illustrating an exemplary method for launching interactive content.

FIG. 2 is a flowchart illustrating an exemplary method 200 for directly launching interactive content. The method 200 of FIG. 2 may be embodied as executable instructions in a non-transitory computer readable storage medium including but not limited to a CD, DVD, or non-volatile memory such as a hard drive. The instructions of the storage medium may be executed by a processor (or processors) to cause various hardware components of a computing device hosting or otherwise accessing the storage medium to effectuate the method. The execution of the instructions may be implemented on the cloud servers 160 (e.g., the steps identified in FIG. 2 are performed in the cloud). The steps identified in FIG. 2 (and the order thereof) are exemplary and may include various alternatives, equivalents, or derivations thereof including but not limited to the order of execution of the same.

In step 210, one or more templates are stored in memory in the platform servers 120 and/or interactive content source servers 110 in association with a corresponding one or more activities of an interactive content title. Each activity may be a progress type, where the user or a group of users completes a single or multiple discrete actions (e.g., one or more quests within a game); an open-ended type, where the player or group of players has no given task to complete (e.g., an open world game where users build objects or explore a gaming world); or a competitive type, where at least two players cooperatively or competitively participate in an activity, and a result is captured (e.g., a head to head match or a team versus boss match). Each template may directly link to the portion of the content title where the user can begin the activity within the title or begin a matchmaking process which matches the user to a competitive match. Such link may, for example, allow the user to skip navigational steps conventionally required to begin interacting with a specific portion of a title or to enter a competitive activity, such that the user simply selects the desired template and immediately begin interacting with the title or is immediately entered into matchmaking. For competitive type templates or templates for multi-player interactions, the templates may include information such as number of players that can participate in the interactive content, number of players per party/team, prizes available, and time limits.

In step 220, the one or more templates may be transmitted from the platform server 120 to the user device 140 when a session is established, where in step 230, a set of templates selected from the one or more templates is provided for display on a display of the user device 140. The set of templates can be displayed on the user interface. Each template may have a status of either available or unavailable. The status may be updated in real-time on the user device 140 by the interactive content servers 110 or platform servers 120. Each template may display information about the corresponding activity (e.g., activity type, time limit, number of players, or payload). The set of templates provide a display of available activities across various interactive content titles in a single interface (e.g., the user interface) without requiring the user to select and launch each interactive content title to view each title's activities. Stated differently, the user can view and select an activity directly, without conventionally launching or access the title first.

As previously described, the set of templates selected can be based on the user intent, which may be stored and maintained in memory. The user intent may include user history (e.g., past activities the user has participated in), as well as third party data (e.g., social media data). The user intent can be analyzed to predict which templates the user may be more likely to interact with. As such, the selected set of templates can be based on the prediction and can be modified as the user intent changes. The set of templates selected based on the prediction can be displayed on the user device 140. In another example, the selected set of templates may be randomly generated.

In step 240, the user may select one of the templates, and in step 250, the activity associated with the selected template may be launched on the user device 140. Such launching allows the user to begin interacting with the interactive content title at the start of the activity linked to the selected template or allows the user to be entered into matchmaking for a competitive match. Data related to the user, interactions, and progress of interactions may be tracked and stored.

Figure 3:
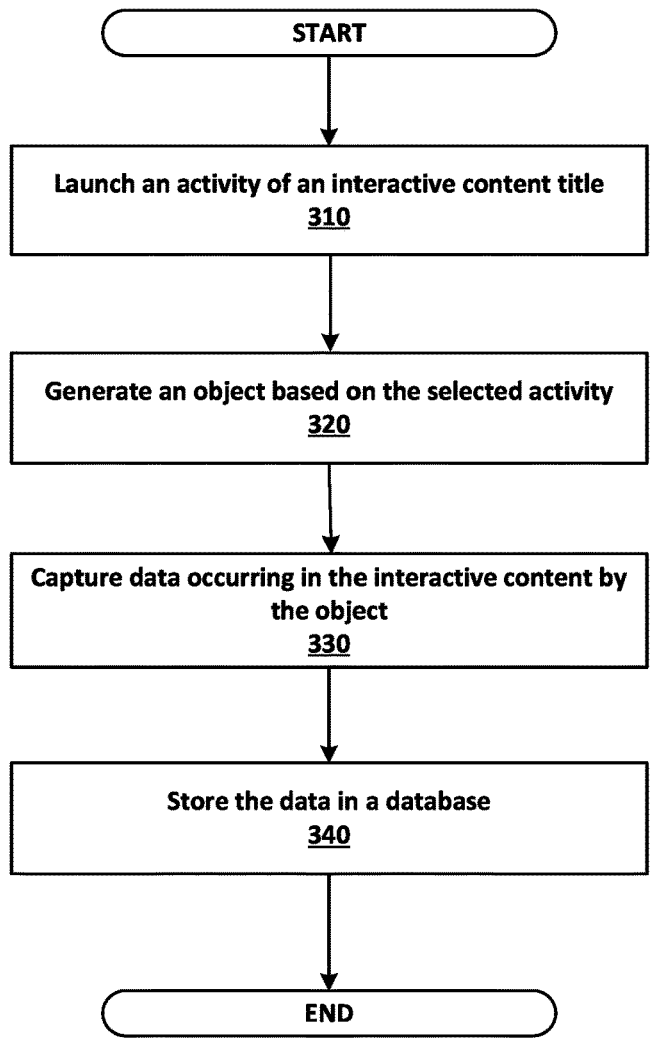
FIG. 3 is a flowchart illustrating an exemplary method for tracking and storing data related to an activity for use in a dynamic interface.

FIG. 3 is a flowchart illustrating an exemplary method 300 for tracking user data and progress after an activity is launched for use in providing a dynamic interface. The method 300 of FIG. 3 may be embodied as executable instructions in a non-transitory computer readable storage medium including but not limited to a CD, DVD, or non-volatile memory such as a hard drive. The instructions of the storage medium may be executed by a processor (or processors) to cause various hardware components of a computing device hosting or otherwise accessing the storage medium to effectuate the method. The execution of the instructions may be implemented on the cloud servers 160 (e.g., the steps identified in FIG. 3 are performed in the cloud). The steps identified in FIG. 3 (and the order thereof) are exemplary and may include various alternatives, equivalents, or derivations thereof including but not limited to the order of execution of the same.

At step 310, an activity of an interactive content title is launched. The activity can be associated with a template selected by a user as described in the method 200 of FIG. 2. The activity can have single-player or multi-player interactions and participation.

At step 320, an object stored in memory is generated based on the type of activity corresponding to the selected template. The object may have a unique identification. At step 330, the object may capture data in accordance with the template upon which the object was based. Such captured data may be related to the activity and associated with the unique identification. At step 340, the object may store the captured data in memory or a database. The data can be related to a progress of the activity, which may be displayed in real-time on the user device 140 and updated by the interactive content servers 110. The object may also store user-generated content generated during the user's participation in the activity. The user-generated content can be, for example, a video, a broadcast, a commentary, a screenshot, or the like. The object may dynamically update a user profile stored in memory and/or displayed on the user device 140 and may be displayed on the user interface. For example, user statistics during the activity can be used to update a user skill displayed on the user profile.

A task object may be generated when a task begins for progress type and open-ended type activities. For example, in a video game, the task may be to complete a chapter or quest of a storyline game. Tasks may be paused, and the incomplete tasks may be displayed in conjunction with the set of templates displayed on the user device 140 and available for selection by the user. The user may be able to resume their interaction from the paused portion after selecting the incomplete task. Another user may also view a task in progress without interacting with the task. Completed tasks may be displayed as re-playable tasks. Task history (e.g., task statistics, user statistics, prizes or other achievements awarded, number of players, etc.) may be stored in memory and/or displayed on the user device 140.

A match object may be generated when a match begins for competitive type activities. The match may include a start, an end, and a result. The start and end can be provided by the interactive content servers 110 or can be determined from metadata of the user-generated content. For example, the user-generated content may be a video that may begin recording when the match starts and may stop recording when the match ends. The match start and match end may then be defined by the start and end of the user-generated content. The match result may be a success or failure and/or may include at least one of a final score, ranking, and team/player information. A match in progress can be displayed on the user device 140 or another user device and the match progress can be updated in real-time by the interactive content servers 110. Another user may also view a match in progress without interacting with the match. A prediction of a result of the match can be generated based on current and/or past match data and current and/or past user data. A completed match may be displayed in conjunction with the set of templates displayed on the user device 140 as a re-playable match.

The match history (e.g., final result, team players, player statistics, match statistics, etc.) can be stored and/or displayed on the user device 140 or stored in memory. Further, user-generated content captured during the match can be stored and/or displayed with the match or in memory. Each user may view user-generated content from other users in the same match, which may, for example, provide videos with different points of views or different commentary of the same match. Match data may be used to match users to matches. For example, users above a certain skill level may be matched together for a particular match. A match may include sub-matches. The sub-matches may be formatted such that a winner is determined based on the outcomes of the sub-matches. For example, a winner of the match may need to win two out of three sub-matches. A match may include any level of sub-matches below the initial sub-match. For example, a match can include a sub-sub match of a sub-match. Matches and corresponding sub-matches can be tracked for multiple games at the platform system 120 and displayed on the user interface.

Data gathered during the task/match by the task/mask objects may be used to update or generate the user intent or separately used to predict future templates, in progress tasks/matches, or re-playable tasks/matches that the user may be likely to interact with, which may then be displayed on the user device 140.

As described, the set of templates displayed on a dynamic interface of the user device 140 can be a mixture of templates (e.g., activities available to interact with, but the user has not yet started), in progress tasks or matches (e.g., activities that the user has started interacting with but has either paused or left), or completed tasks or matches that are re-playable that the user can select from to directly launch the selected template, task, or match within the interactive content title. As such, a user can access various types of activities at different stages of completion across multiple interactive content titles at a single interface (e.g., the user interface). For example, a user interface can display multiple templates for various match activity modes from a first title and also display in progress tasks from a second title, or any combination thereof. Further, task histories and/or match histories can be displayed on the user interface on the user device 140, providing an interactive and rich display of information on the user interface. User profiles may also be displayed on the user interface and updated in real-time as a user progresses through different tasks and/or matches.

Figure 4:
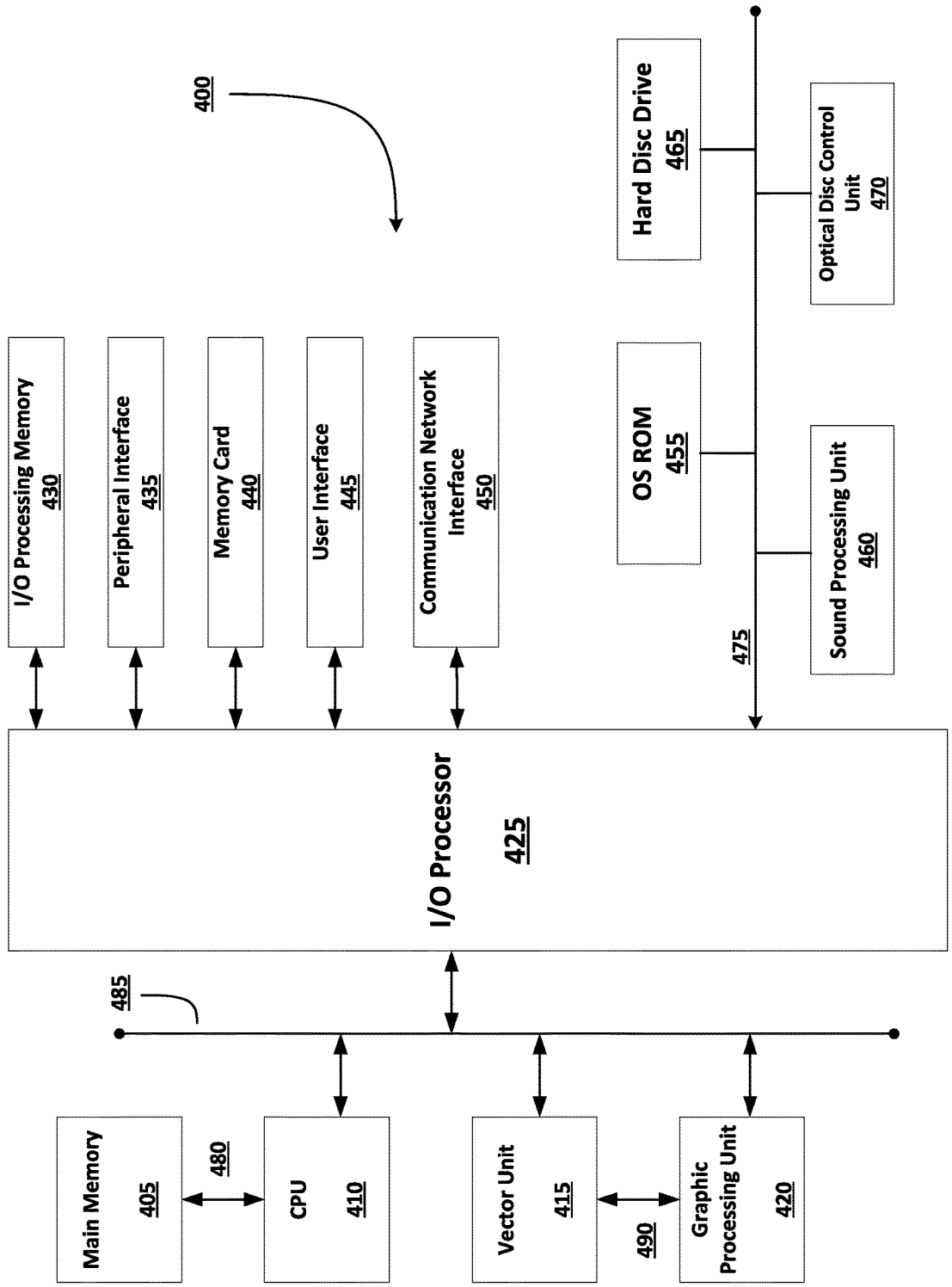
FIG. 4 is an exemplary electronic entertainment system that may be used in launching interactive content and providing dynamic interfaces.

FIG. 4 is an exemplary user electronic entertainment system that may be used in launching interactive content and providing dynamic interfaces. The entertainment system 400 of FIG. 4 includes a main memory 405, a central processing unit (CPU) 410, vector unit 415, a graphics processing unit 420, an input/output (I/O) processor 425, an I/O processor memory 430, a peripheral interface 435, a memory card 440, a Universal Serial Bus (USB) interface 445, and a communication network interface 450. The entertainment system 400 further includes an operating system read-only memory (OS ROM) 455, a sound processing unit 460, an optical disc control unit 470, and a hard disc drive 465, which are connected via a bus 475 to the I/O processor 425.

Entertainment system 400 may be an electronic game console. Alternatively, the entertainment system 400 may be implemented as a general-purpose computer, a set-top box, a hand-held game device, a tablet computing device, a virtual reality device, an augmented reality device, or a mobile computing device or phone. Entertainment systems may contain more or less operating components depending on a particular form factor, purpose, or design.

The CPU 410, the vector unit 415, the graphics processing unit 420, and the I/O processor 425 of FIG. 4 communicate via a system bus 485. Further, the CPU 410 of FIG. 4 communicates with the main memory 405 via a dedicated bus 480, while the vector unit 415 and the graphics processing unit 420 may communicate through a dedicated bus 490. The CPU 410 of FIG. 4 executes programs stored in the OS ROM 455 and the main memory 405. The main memory 405 of FIG. 4 may contain pre-stored programs and programs transferred through the I/O Processor 425 from a CD-ROM, DVD-ROM, or other optical disc (not shown) using the optical disc control unit 470. I/O Processor 425 of FIG. 4 may also allow for the introduction of content transferred over a wireless or other communications network (e.g., 4G, LTE, 1G, and so forth). The I/O processor 425 of FIG. 4 primarily controls data exchanges between the various devices of the entertainment system 400 including the CPU 410, the vector unit 415, the graphics processing unit 420, and the peripheral interface 435.

The graphics processing unit 420 of FIG. 4 executes graphics instructions received from the CPU 410 and the vector unit 415 to produce images for display on a display device (not shown). For example, the vector unit 415 of FIG. 4 may transform objects from three-dimensional coordinates to two-dimensional coordinates, and send the two-dimensional coordinates to the graphics processing unit 420. Furthermore, the sound processing unit 460 executes instructions to produce sound signals that are outputted to an audio device such as speakers (not shown). Other devices may be connected to the entertainment system 400 via the USB interface 445, and the communication network interface 450 such as wireless transceivers, which may also be embedded in the system 400 or as a part of some other component such as a processor.

A user of the entertainment system 400 of FIG. 4 provides instructions via the peripheral interface 435 to the CPU 410, which allows for use of a variety of different available peripheral devices (e.g., controllers) known in the art. For example, the user may instruct the CPU 410 to store certain game information on the memory card 440 or other non-transitory computer-readable storage media or instruct a character in a game to perform some specified action.

The present invention may be implemented in an application that may be operable by a variety of end user devices. For example, an end user device may be a personal computer, a home entertainment system (e.g., Sony PlayStation2® or Sony PlayStation3® or Sony PlayStation4®), a portable gaming device (e.g., Sony PSP® or Sony Vita®), or a home entertainment system of a different albeit inferior manufacturer. The present methodologies described herein are fully intended to be operable on a variety of devices. The present invention may also be implemented with cross-title neutrality wherein an embodiment of the present system may be utilized across a variety of titles from various publishers.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method for direct activity launch within interactive content, the method comprising:
storing data in memory of a platform server regarding a plurality of interactive content titles that each includes a virtual environment associated with one or more templates, wherein each template corresponds to a different gameplay mode available within the interactive content title and includes a link to a respective starting point of an activity within the virtual environment and a display of the linked activity;
establishing a session between a user device and the platform server, wherein the session is established over a communication network;
identifying an intent of a user of the user device based on a user profile associated with the user device;
making a prediction that the user is likely to interact with one or more activities of one or more interactive content titles of the plurality of interactive content titles based on the identified intent;
selecting a set of the templates corresponding to the one or more activities of one or more interactive content titles of the plurality of interactive content titles based on the prediction; and
generating an interface display for the user device, the interface display including a plurality of activity displays corresponding to the selected set of templates, wherein each of the activity displays is selectable to launch the associated activity in accordance with the corresponding gameplay mode at the starting point specified by the link in the associated template.

2. The method of claim 1, wherein identifying the intent is further based on a user history of one or more past activities or third-party data.

3. The method of claim 1, further comprising:
identifying user interaction associated with the one or more interactive content titles; and
dynamically updating the interface display in real-time based on the identified user interaction, wherein dynamically updating the interface display includes updating the intent of the user and the prediction to correspond to an updated set of templates.

4. The method of claim 1, further comprising:
receiving a user selection of one of the activity displays associated with one of the templates from the interface display;
identifying that the template associated with the selected activity display includes the link to the starting point of an identified activity; and
launching the identified activity at the starting point linked by the link in the template associated with the selected activity display, wherein launching the identified activity includes skipping one or more navigational steps between a beginning point of an associated interactive content title and the linked starting point of the identified activity.

5. The method of claim 1, further comprising:
generating a data object based on a type of activity corresponding to a selected template, wherein the data object captures data regarding user interaction with the corresponding activity in accordance with the selected template; and
storing the captured data in the memory.

6. The method of claim 5, wherein the data object captures the data in real-time with the user interaction, and the method further comprising dynamically updating the interface display based on the captured data.

7. The method of claim 1, wherein the set of selected templates includes a template associated with at least one of different chapters of an interaction content title having an interactive storyline form, a waypoint within a storyline of an interactive content title, matchmaking that assigns the user to a competition match based on at least one of skill, experience level, and availability of peers, and different stages in completion of an activity.

8. The method of claim 1, further comprising selecting a different set of activity displays associated with different templates to include in the interface display based on a changed intent.

9. The method of claim 1, further comprising selecting a different set of activity displays associated with different templates for a different user device based on a different intent identified for a user of the different user device.

10. The method of claim 1, wherein the selected set of templates includes one or more templates corresponding to available activities that the user has not yet started.

11. The method of claim 1, wherein launching the activity in accordance with the corresponding gameplay mode via the link includes teleporting a character of the user to a designated location associated with the launch activity within the virtual environment.

12. The method of claim 1, wherein starting the activity in a conventional mode includes one or more navigational steps, and wherein launching the activity in accordance with the corresponding gameplay mode via the link includes skipping one or more of the navigational steps.

13. A non-transitory computer-readable storage medium having embodied thereon a program executable by a processor to perform a method for direct activity launch within interactive content, the method comprising:
storing data in memory of a platform server regarding a plurality of interactive content titles that each includes a virtual environment associated with one or more templates, wherein each template corresponds to a different gameplay mode available within the interactive content title and includes a link to a respective starting point of an activity within the virtual environment and a display of the linked activity;

establishing a session between a user device and the platform server, wherein the session is established over a communication network;

identifying an intent of a user of the user device based on a user profile associated with the user device;

making a prediction that the user is likely to interact with one or more activities of one or more interactive content titles of the plurality of interactive content titles based on the identified intent;

selecting a set of the templates corresponding to the one or more activities of one or more interactive content titles of the plurality of interactive content titles based on the prediction; and generating an interface display for the user device, the interface display including a plurality of activity displays corresponding to the selected set of templates, wherein each of the activity displays is selectable to launch the associated activity at the starting point specified by the link in the associated template.

14. The non-transitory computer-readable storage medium of claim 13, wherein identifying the intent is further based on user history of one or more past activities or third-party data.

15. The non-transitory computer-readable storage medium of claim 13, further comprising instructions executable for:

identifying user interaction associated with the one or more interactive content titles; and dynamically updating the interface in real-time display based on the identified user interaction, wherein dynamically updating the interface display includes updating the intent of the user and the prediction to correspond to an updated set of templates.

16. The non-transitory computer-readable storage medium of claim 13, further comprising instructions executable for:

receiving a user selection of one of the activity displays associated with one of the templates from the interface display;

identifying that the template associated with the selected activity display includes the link to the starting point of an identified activity; and launching the identified activity at the starting point linked by the link in the template associated with the selected activity display, wherein launching the identified activity includes skipping one or more navigational steps between a beginning point of an associated interactive content title and the linked starting point of the identified activity.

17. The non-transitory computer-readable storage medium of claim 13, further comprising instructions executable for:

generating a data object based on a type of activity corresponding to a selected template, wherein the data object captures data regarding user interaction with the corresponding activity in accordance with the selected template; and storing the captured data in the memory.

18. The non-transitory computer-readable storage medium of claim 17, wherein the data object captures the data in real-time with the user interaction, and the method further comprising instructions executable for dynamically updating the interface display based on the captured data.

19. A system for direct activity launch within interactive content, the system comprising:

one or more databases in memory that store data regarding a plurality of interactive content titles that each includes a virtual environment associated with one or more templates, wherein each template corresponds to a different gameplay mode available within the interactive content title and includes a link to a respective starting point of an activity within the virtual environment and a display of the linked activity of an associated interactive content title, wherein the plurality of interactive content titles are provided;

a network interface that communicates with a user device over a communication network, wherein the network interface establishes a session between the user device and a platform server, wherein the session is established over the communication network; and a processor that executes instructions stored in memory, wherein the processor executes the instructions to:

identify an intent of a user of the user device based on a user profile associated with the user device;

make a prediction that the user is likely to interact with one or more activities of one or more interactive content titles of the plurality of interactive content titles based on the identified intent;

select a set of the templates corresponding to the one or more activities of one or more interactive content titles of the plurality of interactive content titles based on the prediction; and generate an interface display for the user device, the interface display including plurality of activity displays corresponding to the selected set of templates, wherein each of the activity displays is selectable to launch the associated activity in accordance with the corresponding gameplay mode at the starting point specified by the link in the associated template.

20. The system of claim 19, wherein identifying the intent is further based on a user history of one or more past activities or third-party data.

21. The system of claim 19, wherein the processor executes further instructions to:

receive a user selection of one of the activity displays associated with one of the templates from the interface display;

identify that the template associated with the selected activity display includes the link to a starting point of an identified activity; and launch the identified activity at the starting point linked by the link in the template associated with the selected activity display, wherein launching the identified activity includes skipping one or more navigational steps between a beginning point of an associated interactive content title and the linked starting point of the identified activity.

22. The system of claim 19, wherein the processor executes further instructions to:

identify user interaction associated with the one or more interactive content titles; and dynamically update the interface display in real-time based on the identified user interaction, wherein dynamically updating the interface display includes updating the intent of the user and the prediction to correspond to an updated set of templates.

23. The system of claim 19, wherein the processor executes further instructions to:

generate a data object based on a type of activity corresponding to a selected template, wherein the data object captures data regarding user interaction with the corresponding activity in accordance with the selected template; and store the captured data in the memory.

24. The system of claim 23, wherein the data object captures the data in real-time with the user interaction, and further comprising dynamically updating the interface display based on the captured data.

25. The system of claim 19, wherein the set of selected templates includes a template associated with at least one of different chapters of an interaction content title having an interactive storyline form, a waypoint within a storyline of an interactive content title, matchmaking that assigns the user to a competition match based on at least one of skill, experience level, and availability of peers, and different stages in completion of an activity.

\* \* \* \* \*